US012725188B2

(12) United States Patent
Abhyankar et al.

(10) Patent No.: US 12,725,188 B2
(45) Date of Patent: Sep. 1, 2026

(54) SEAMLESS INTERACTION PROCESSING WITH DATA SECURITY

(71) Applicant: Visa International Service Association, San Francisco, CA (US)

(72) Inventors: Abhishek Abhyankar, Kirkland, WA (US); Parag Chaudhari, Austin, TX (US)

(73) Assignee: Visa International Service Association, San Francisco, CA (US)

(*) Notice: Subject to any disclaimer, the term of this patent is extended or adjusted under 35 U.S.C. 154(b) by 141 days.

(21) Appl. No.: 17/762,652

(22) PCT Filed: Nov. 7, 2019

(86) PCT No.: PCT/US2019/060249
§ 371 (c)(1),
(2) Date: Mar. 22, 2022

(87) PCT Pub. No.: WO2021/091559
PCT Pub. Date: May 14, 2021

(65) Prior Publication Data
US 2022/0343380 A1 Oct. 27, 2022

(51) Int. Cl.
*G06Q 30/04* (2012.01)
*G06F 21/33* (2013.01)
(Continued)

(52) U.S. Cl.
CPC ............. *G06Q 30/04* (2013.01); *G06F 21/33* (2013.01); *G06Q 20/40* (2013.01); *G06Q 40/00* (2013.01)

(58) Field of Classification Search
CPC ...... G06Q 30/04; G06Q 40/00; G06Q 20/385; G06F 21/6245
See application file for complete search history.

(56) References Cited

U.S. PATENT DOCUMENTS 5,870,724 A * 2/1999 Lawlor ................ G06Q 20/108 705/14.69
6,202,054 B1 * 3/2001 Lawlor ............. G06Q 30/0273 705/42
(Continued)

FOREIGN PATENT DOCUMENTS

WO WO-2004038528 A2 * 5/2004 ........... G06F 16/951
WO 2007118052 A2 10/2007
(Continued)

OTHER PUBLICATIONS

PCT/US2019/060249 , "International Search Report and Written Opinion", Aug. 5, 2020, 10 pages.
(Continued)

*Primary Examiner* — Ambreen A. Alladin
(74) *Attorney, Agent, or Firm* — Kilpatrick Townsend & Stockton LLP

(57) ABSTRACT

A method is provided that includes receiving an invoice from a recipient computer, the invoice providing details regarding goods and/or services purchased by a requestor operating a requestor computer, and an amount associated with the goods and/or services. The method also includes receiving an instruction including a requestor identifier and a recipient identifier from the requestor computer to pay the recipient for the amount, and obtaining an account identifier, without communicating with the recipient computer. The method further includes initiating, by a processing module, the generation of an authorization request message with the account identifier and the amount or an amount derived from the amount to an authorizing entity computer.

20 Claims, 5 Drawing Sheets

(51) Int. Cl.
*G06Q 20/40* (2012.01)
*G06Q 40/00* (2023.01)

(56) References Cited

U.S. PATENT DOCUMENTS

| | | | | |
|---|---|---|---|---|
| 7,076,458 | B2 * | 7/2006 | Lawlor | G06Q 20/042 705/40 |
| 7,263,506 | B2 * | 8/2007 | Lee | G06Q 20/4016 705/318 |
| 7,693,790 | B2 * | 4/2010 | Lawlor | G06Q 40/02 705/40 |
| 8,170,928 | B2 * | 5/2012 | Knowles | G06Q 20/12 705/28 |
| 8,266,047 | B2 * | 9/2012 | Galit | G06Q 40/04 705/37 |
| 8,275,672 | B1 * | 9/2012 | Nguyen | G06Q 30/0635 705/26.1 |
| 8,762,213 | B1 * | 6/2014 | Schutz | G06Q 30/04 705/26.1 |
| 9,129,320 | B2 * | 9/2015 | Martin | G06Q 20/12 |
| 9,715,689 | B1 * | 7/2017 | Ellis | G06Q 20/202 |
| 9,799,026 | B1 * | 10/2017 | Allen | G06Q 20/351 |
| 11,004,063 | B1 * | 5/2021 | Allen | G06Q 20/0855 |
| 2002/0023054 | A1 * | 2/2002 | Gillespie | G06Q 20/12 705/39 |
| 2002/0038289 | A1 * | 3/2002 | Lawlor | G06Q 20/04 705/42 |
| 2003/0126094 | A1 * | 7/2003 | Fisher | G06Q 20/10 705/75 |
| 2004/0215564 | A1 * | 10/2004 | Lawlor | H04M 17/02 705/40 |
| 2004/0260631 | A1 | 12/2004 | Leventhal | |
| 2005/0114367 | A1 * | 5/2005 | Serebrennikov | G06Q 20/34 707/E17.115 |
| 2008/0120210 | A1 * | 5/2008 | Leventhal | G06Q 20/027 705/40 |
| 2009/0187507 | A1 * | 7/2009 | Brown | G06Q 20/4093 235/382 |
| 2009/0228340 | A1 * | 9/2009 | Bohannon | G06Q 30/0217 709/204 |
| 2011/0202463 | A1 * | 8/2011 | Powell | G06Q 40/02 705/44 |
| 2013/0097081 | A1 * | 4/2013 | Leavitt | G06Q 20/02 705/44 |
| 2013/0238455 | A1 * | 9/2013 | Laracey | G06Q 20/102 705/21 |
| 2014/0372308 | A1 | 12/2014 | Sheets | |
| 2014/0379582 | A1 * | 12/2014 | Caglayan | G06Q 20/3226 705/44 |
| 2015/0032622 | A1 * | 1/2015 | Powell | G06Q 20/407 705/44 |
| 2015/0154584 | A1 * | 6/2015 | Prashant | G06Q 20/24 705/44 |
| 2015/0371212 | A1 | 12/2015 | Giordano et al. | |
| 2016/0063201 | A1 * | 3/2016 | Allen | G06Q 20/351 705/2 |
| 2016/0148212 | A1 * | 5/2016 | Dimmick | G06Q 20/386 705/44 |
| 2016/0232308 | A1 * | 8/2016 | Allen | G06Q 10/10 |
| 2017/0228723 | A1 * | 8/2017 | Taylor | G06Q 20/367 |
| 2018/0174210 | A1 * | 6/2018 | Williams | G06Q 20/403 |
| 2019/0251569 | A1 * | 8/2019 | Dimmick | G06Q 20/4014 |
| 2023/0231717 | A1 * | 7/2023 | Banow | H04L 9/3213 726/9 |

FOREIGN PATENT DOCUMENTS

| | | | | |
|---|---|---|---|---|
| WO | WO-2021091559 | A1 * | 5/2021 | G06F 21/33 |
| WO | WO-2021119619 | A1 * | 6/2021 | G06Q 20/102 |

OTHER PUBLICATIONS

"Extended Search Report", EP Application No. 19951324.3, Oct. 13, 2022, 9 pages.

Application No. CN201980102446.6 , Office Action, Mailed On Dec. 5, 2024, 18 pages.

Application No. SG11202203128W , Written Opinion, Mailed On Oct. 29, 2024, 8 pages.

Application No. CN201980102446.6 , Office Action, Mailed on Sep. 30, 2025, 8 pages.

Application No. CN201980102446.6, Office Action, Mailed on Jul. 10, 2025, 16 pages.

Application No. SG11202203128W, Further Written Opinion, Mailed on Dec. 31, 2025, 9 pages.

* cited by examiner

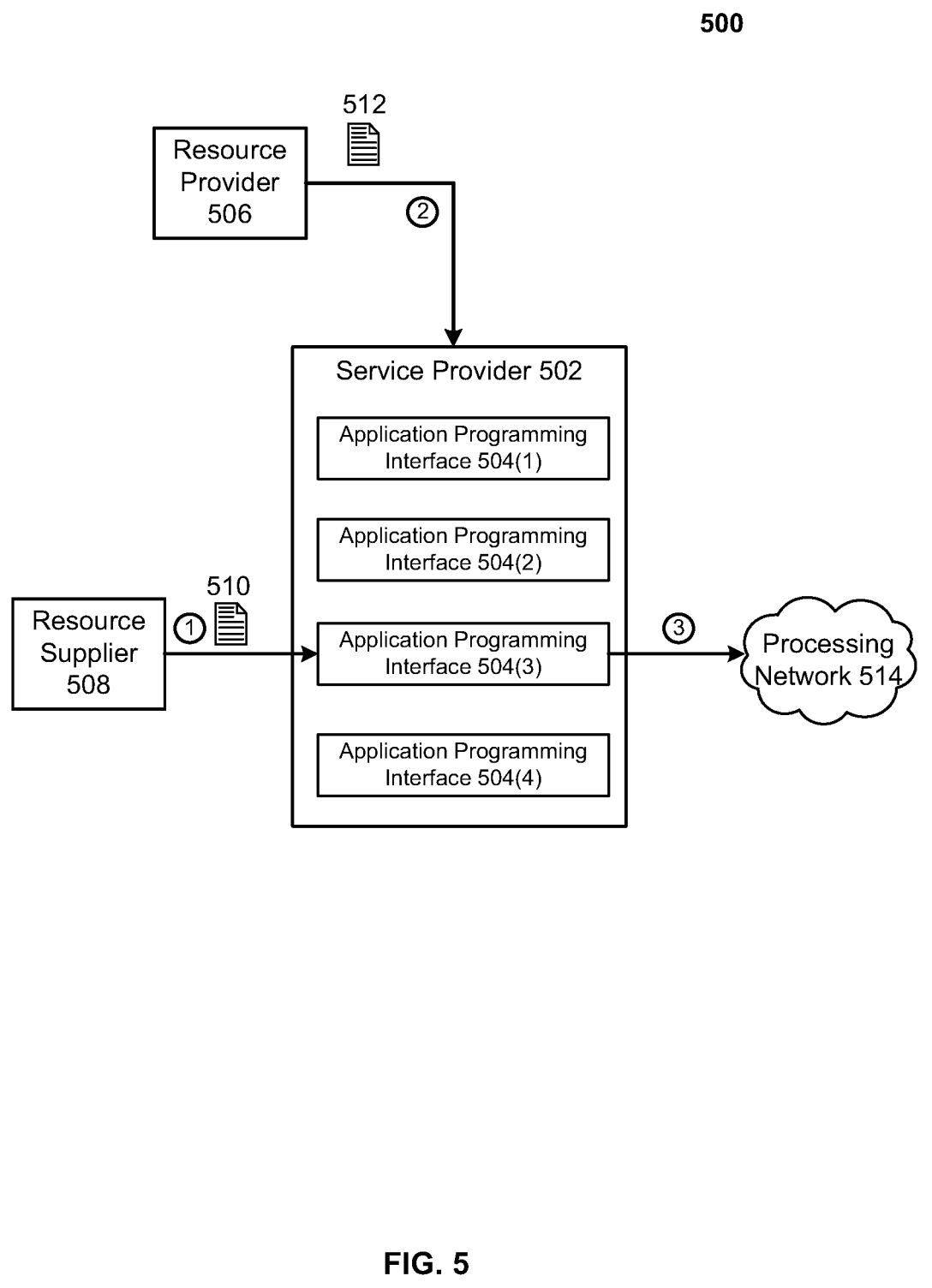

Resource Provider 506

2

Service Provider 502

Application Programming Interface 504(1)

Application Programming Interface 504(2)

510

Resource Supplier 508

1

Application Programming Interface 504(3)

3

Processing Network 514

Application Programming Interface 504(4)

FIG. 5

SEAMLESS INTERACTION PROCESSING WITH DATA SECURITY

CROSS-REFERENCE TO RELATED APPLICATIONS

This application is a National Stage of International Application No. PCT/US2019/060249, filed Nov. 7, 2019, which is herein incorporated by reference in its entirety for all purposes.

BACKGROUND

A business can interact with a number of different suppliers during its operation. Each of these different suppliers will typically provide invoices for goods and/or services (e.g., raw materials, finished goods, supplies, etc.) provided to the business. Such interactions can be characterized as business to business transactions.

In some conventional systems, a payment device such as credit or debit cards can be used to conduct such business to business transactions. In such systems, a buyer such as a grocery store may wish to pay suppliers such as produce suppliers and meat suppliers. The buyer may provide a credit or debit card number to the suppliers, and the suppliers may invoice the buyer through an accounts payable system. After the buyer approves of the invoices, the suppliers may submit payment card transactions using the accounts payable system and the credit or debit card account number. The suppliers are then eventually paid.

A number of problems are associated with systems like those above. For example, in such systems and methods, the buyer supplies the credit or debit card number to the suppliers. Although the use of the credit and/or debit cards to pay for transactions is efficient, the suppliers nonetheless have possession of the credit or debit card numbers. If the suppliers are unscrupulous, then there is a risk that the credit or debit cards may be used in an unauthorized manner.

One solution to the risk issue may involve the use of single use account credit or debit card account numbers. While this solution is useful as it prevents repeated fraudulent use of an account number, it does not completely limit risk since the single use account number can still be used in a fraudulent manner. Furthermore, generating single use account numbers creates its own problems. For example, there can be millions of transactions occurring in a transaction system like an accounts payable system. Continually creating new card numbers for each and every transaction can create a problem with respect to number shortages. Further, the management of single use accounts numbers is complex, as computer systems constantly need to keep track of the creation and deletion of account numbers.

Another issue can relate to supplier integration with the accounts payable system. The integration of buyers and suppliers can be difficult, as each supplier in the conventional system may need to register. The registration process can be difficult and cumbersome.

Embodiments of the disclosure address these and other problems, individually and collectively.

SUMMARY

One embodiment of the disclosure is directed to a method performed by a server computer comprising receiving, by a server computer from a requestor computer, a requestor identifier associated with a requestor and a recipient identifier associated with a recipient; prompting, by the server computer, a recipient computer operated by the recipient to accept payment through the service provider system; receiving, by the recipient computer, a response to the prompt; receiving, by the server computer, an instruction comprising the requestor identifier and the recipient identifier from the requestor computer to pay the recipient for a transaction; obtaining, by the server computer, the account identifier from the server computer, without communicating with the recipient computer; and initiating, by a processing module in the server computer, the generation of an authorization request message comprising the account identifier and the amount to an authorizing entity computer.

Another embodiment of the disclosure is directed to a processor; and a memory including instructions that, when executed with the processor, cause the server computer to, at least: receive, from a requestor computer, a requestor identifier associated with a requestor and a recipient identifier associated with a recipient; prompt, by the server computer, a recipient computer operated by the recipient to accept payment through the service provider system; receive, by the recipient computer, a response to the prompt; receive, by the server computer, an instruction comprising the requestor identifier and the recipient identifier from the requestor computer to pay the recipient for a transaction; obtain, by the server computer, the account identifier from the server computer, without communicating with the recipient computer; and initiating, by a processing module in the server computer, the generation of an authorization request message comprising the account identifier and the amount to an authorizing entity computer These and other embodiments of the disclosure are described in further detail below.

BRIEF DESCRIPTION OF THE DRAWINGS

FIG. 4 depicts a first exemplary process by which a service provider may enable a resource provider to push a straight-through-payment to a recipient entity.

FIG. 5 depicts a second exemplary process by which a service provider may enable a resource provider to push a straight-through-payment to a recipient entity.

DETAILED DESCRIPTION

Figure 1:
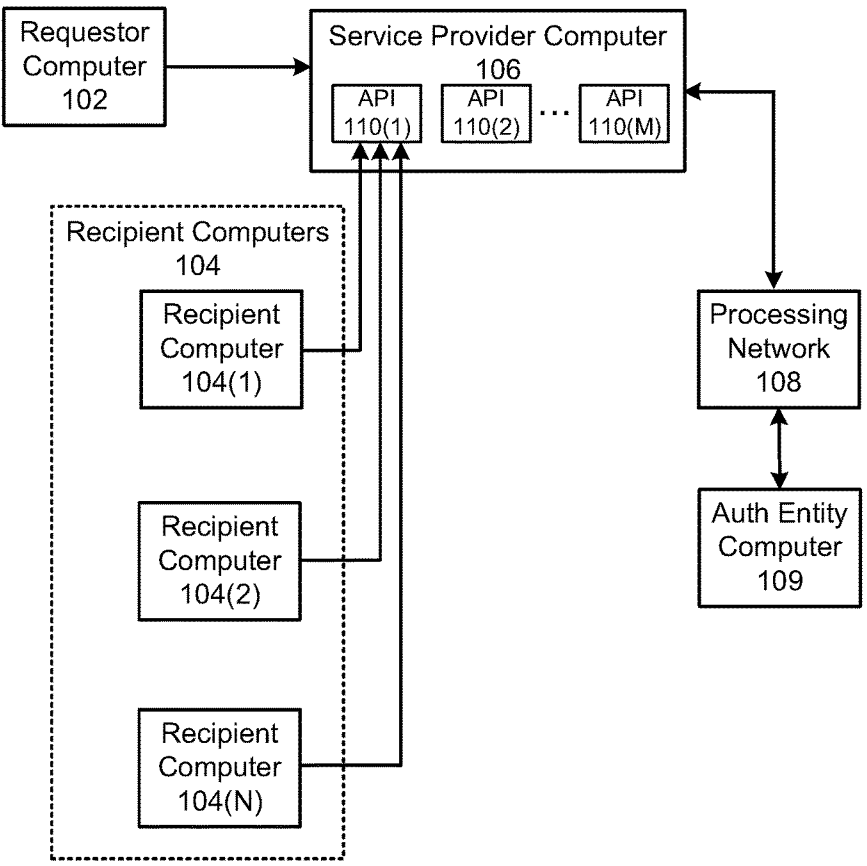
FIG. 1 shows a high level block diagram of a system according to embodiments.

Prior to discussing the details of some embodiments of the present disclosure, description of some terms may be helpful in understanding the various embodiments.

An "application" or "software application" may be a computer program that is used for a specific purpose.

An "Application Programming Interface" (API) is a set of procedures, protocols, or tools for interacting with software applications. An API may be used to build applications which allow communication between one or more entities. Examples of APIs include POSIX™, and the C++ Standard Template Library. An "API call" is a communication between two software applications or computers made possible by an API. An API call could include a standardized method of requesting or delivering information between software applications, such as a client-side application and a server-side application according to the server-side API. An API call could take the form of an HTTP method, such as GET, POST, PUT, or DE.

"Authentication" may include a process for verifying an identity of something (e.g., a user). One form of authentication can be biometric authentication.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account, and a message type indicator. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, resource provider identifier, resource provider location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, resource provider must call the toll-free authorization phone number. The authorization response message may also include an authorization code, which may be a code that a credit card issuing bank returns in response to an authorization request message in an electronic message (either directly or through the transaction processing computer) to the resource providers access device (e.g., POS equipment) that indicates approval of the transaction. The code may serve as proof of authorization.

An "authorization provider" can be an entity which can authorize or approve transactions. An authorization provider may typically refer to a business entity (e.g., a bank) that maintains an account for a user and is capable of authorizing transactions such as payment transactions, for example the purchase of goods or services. An authorization provider may provide a statement of the account to the user listing the transactions on the account. An authorization provider may enable a user to select a transaction on their statement to see a detailed digital receipt. The authorization provider may request the digital receipt from a processing server that provides an API for requesting digital receipts.

A "computing device" may be any suitable device that can receive and process data. Examples of computing devices may include access devices, transport computers, processing network computers, or authorization computers.

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may refer to any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "resource" may be something that may be used or consumed by an entity or transferred between entities. A resource may also be something that is accessed by an entity. For example, the resource may be an electronic resource (e.g., stored data, received data, a computer account, a financial account, a network-based account, an email inbox), a physical resource (e.g., a tangible object, a building, a safe, or a physical location), or other electronic communications between computers (e.g., a communication signal corresponding to an account for performing a transaction).

A "requestor" may be an entity that submits a request to complete a transaction. In some cases, a requestor may be a resource provider that submits a request to make payment to a supplier. Examples of a resource providers include a merchant website operator, a data storage provider, an internet service provider, a bank, a merchant, a building owner, a governmental entity, etc. A requestor computer may be any computing device operated by, or on behalf of, a requestor in order to submit such a request.

A "requestor identifier" may include any suitable information that can identify a requestor or the requestor computer operated by the requestor. The requestor identifier may include any suitable form. For example, examples of requestor identifiers may include e-mail addresses, IP addresses, usernames, phone number, a service provider account number, a specific identifier created by a service provider computer for a requestor, etc.

A "recipient" may be an entity which is intended to receive something. In some embodiments, a recipient may be an entity that can receive payment for an invoice from a requestor. A recipient computer may be any computing device operated by, or on behalf of, a recipient in order to manage received resources.

A "recipient identifier" may include any suitable information that can identify a recipient or the recipient computer operated by the recipient. The requestor identifier may include any suitable form. For example, examples of requestor identifiers may include e-mail addresses, IP addresses, usernames, phone number, a service provider account number, a specific identifier created by a service provider computer for a recipient, etc.

A "server computer" may include a powerful computer or cluster of computers. For example, the server computer can be a large mainframe, a minicomputer cluster, or a group of servers functioning as a unit. In one example, the server computer may be a database server coupled to a Web server. A server computer may be coupled to a database and may include any hardware, software, other logic, or combination of the preceding for servicing the requests from one or more client computers. A server computer may comprise one or more computational apparatuses and may use any of a variety of computing structures, arrangements, and compilations for servicing the requests from one or more client computers.

"Conditional control data" can include data which can control or limit the execution payment transactions associated with payment instructions. For example, in embodiments of the invention, conditional control data can include rules provided by a buyer, where the rules can set an upper limit on a transaction amount, or limit the transaction amount to an exact amount. When an authorization request message corresponding to a payment instruction is received by a server computer, the server computer can reply by indicating that the authorization request message is not authorized. Conditional control data can define or limit any particular characteristic of an approvable transaction including a transaction amount, a transaction time, a transaction location, a type of transaction, etc.

Details of some embodiments of the present disclosure will now be described in greater detail.

FIG. 1 depicts an illustrative overview of a system capable performing automated accounts payable processing. For clarity, a certain number of components are shown in FIG. 1. It is understood, however, that embodiments of the disclosure may include more than one of each component. In addition, some embodiments of the disclosure may include fewer than or greater than all of the components shown in FIG. 1.

The system includes a requestor computer 102 operated by a requestor (e.g., a merchant that acts as a buyer) as well as multiple recipient computers 104 (1-N) operated by multiple recipients (e.g., suppliers of goods to a merchant that sells goods). The system may also include a service provider computer 106 capable of interacting with the requestor computer 102, the multiple recipient computers 104, and a processing network 108. The processing network 108 may be in communication with an authorizing entity computer 109 (e.g., an issuer computer). The service provider computer 106 may be a server computer that is present in or forms an accounts payable system.

Each of the entities in FIG. 1 may communicate through any suitable communication channel or communications network. A suitable communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

The requestor computer 102 may be any suitable computing device operated by, or on behalf of, a requestor. In some embodiments, the requestor computer 102 may include a service interface capable of enabling the requestor computer 102 to communicate with the service provider computer 106 in order to initiate one or more of the processes described herein. For example, the requestor computer 102 may communicate with the service provider computer 106 to identify the recipient computers 104 such that the recipient computers 104 are able to onboard to the service provider computer 106 and provide invoices to the requestor computer 102 via the service provider computer 106. In another example, the requestor computer 102 may communicate with the service provider computer 106 to initiate a payment to a recipient computer 104.

A recipient computer 104 may be any computing operated by, or on behalf of, a recipient. In some embodiments, each recipient may be a resource supplier that supplies resources and/or services to a requestor (e.g., requestor computer 102). Each recipient computer 104 may be associated with multiple requestor computers. In some embodiments, a recipient computer 104 may include a service interface configured to enable interaction with the service provider computer 106 in order to initiate one or more processes as described herein. For example, a recipient computer 104 may communicate with the service provider computer 106 in order to provide an electronic bill or invoice to the service provider computer 108 so that the requestor operating the requestor computer 102 can pay it. In another example, a particular recipient computer 104 may communicate with the service provider computer 106 in order to enroll or create an association between the particular recipient computer 104 and a particular requestor computer 102.

The service provider computer 106 may be any computing device configured to perform at least a portion of the functionality described herein. In some embodiments, the service provider computer 106 may be part of or may form an accounts payable automation system. An exemplary accounts payable automation system can include software and hardware to: receive file payments, online payments, and Web-services payments; process invoices; send notifications, and initiate the generation of authorization request messages to conduct payment card transactions.

In some optional embodiments, the service provider computer 106 may be programmed with a "reseller" function. The reseller function may allow an entity (e.g., a bank) to "resell" services (e.g., merchant acceptance payment services, accounts payable services, fraud services, etc.) provided by the service provider computer 106. In an example reselling scenario, a reseller such as a bank, may resell the merchant acceptance services provided by the service provider computer 106 to various merchants. The merchants may be considered purchasers of the resold service. The bank may obtain some fee from the operator of the service provider computer 106 in exchange for being a reseller. In embodiments, the "reseller" function may be advantageously repurposed to onboard suppliers to the service provider computer 106. That is, in an accounts payable environment, the requestor (e.g., a merchant buyer) may act as a reseller, and may onboard recipients (e.g., sellers that sells goods to the merchant buyer) to the service provider computer By repurposing a reseller functionality to onboard suppliers to an accounts payable automation system, suppliers can be advantageously onboarded quickly and easily without creating an entirely new system with new software.

In some embodiments, the service provider computer 106 may also be configured to use, for each requestor computer 102 and/or recipient computer 104, a separate application programming interface (API) 110 (e.g., API 110(1-M)) specific to that entity in order to perform actions on behalf of the entity. For example, the service provider computer 106 may, upon enrollment of a requestor computer 102 with the service provider, have an API 110(1) which corresponds to requestor computer 102. In some embodiments, the API 110 may provide or receive access credentials (e.g., a login and password) specific to the requestor computer 102, a payment device, and/or a transaction key. For example, upon receiving, via the API 110 instructions from a requestor computer 102 to complete a payment to be received by a particular recipient associated with a particular recipient computer

104(1), the service provider computer 106 may then charge an account identifier (e.g., a payment account identifier) associated with the requestor computer 102 and initiate the generation and submission of an authorization request message for the transaction to the processing network 108 (e.g., a payment processing network) on behalf of the recipient computer 104(1), without any communication with the recipient computer 104(1). In this way, the recipient computer 104 is able to receive the payment without any action on the part of the recipient computer 104 and without the need to provide payment device details to the recipient computer 104 (maintaining security of that payment device and preventing potential fraud by the recipient).

The processing network 108 may be any group of computing devices configured to route messages. In some embodiments, the processing network 108 may be a payment processing network configured to convey authorization request messages from a submitting entity to an authorizing entity computer 109 (e.g., an issuer computer).

The processing network 108 may be a payment processing network and may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet.

By way of illustrating an example interaction between the various components of FIG. 1, consider a scenario in which a Resource Supplier A (operating one of the recipient computers 104) requests payment from a Resource Provider, which may operate the requestor computer 102. In this scenario, the Resource Provider may first enroll with the service provider computer 106. Upon enrollment, as noted above, the requestor computer 102 may become a "reseller" or "redistributor" of the services offered by the service provider computer 106. The requestor computer 102 may use an API to provide its own requestor identifier and/or transaction key to the service provider computer 106. The requestor computer 102 may then establish a relationship with the Resource Supplier A. In some cases, this may involve the Resource Provider providing contact information for Resource Supplier A (e.g., a recipient identifier or resource supplier identifier) to the service provider computer 106 and the service provider computer may contact the recipient computer operated by Resource Supplier A. Once enrolled, Resource Supplier A could then upload a bill or invoice to the service provider computer 106 to be paid by the Resource Provider.

Continuing with the above scenario, once the Resource Provider has approved the invoice for payment (resulting in submission to the service provider of a request to make a payment), the service provider computer 106 may initiate the API associated with the Resource Provider with an indication of Resource Supplier A and an amount to be paid (e.g., a request to initiate the API may include a merchant identifier for Resource Supplier A). The API may then cause the service provider computer 106 to charge a payment device associated with the Resource Provider on behalf of Resource Supplier A for the amount due.

Figure 2:
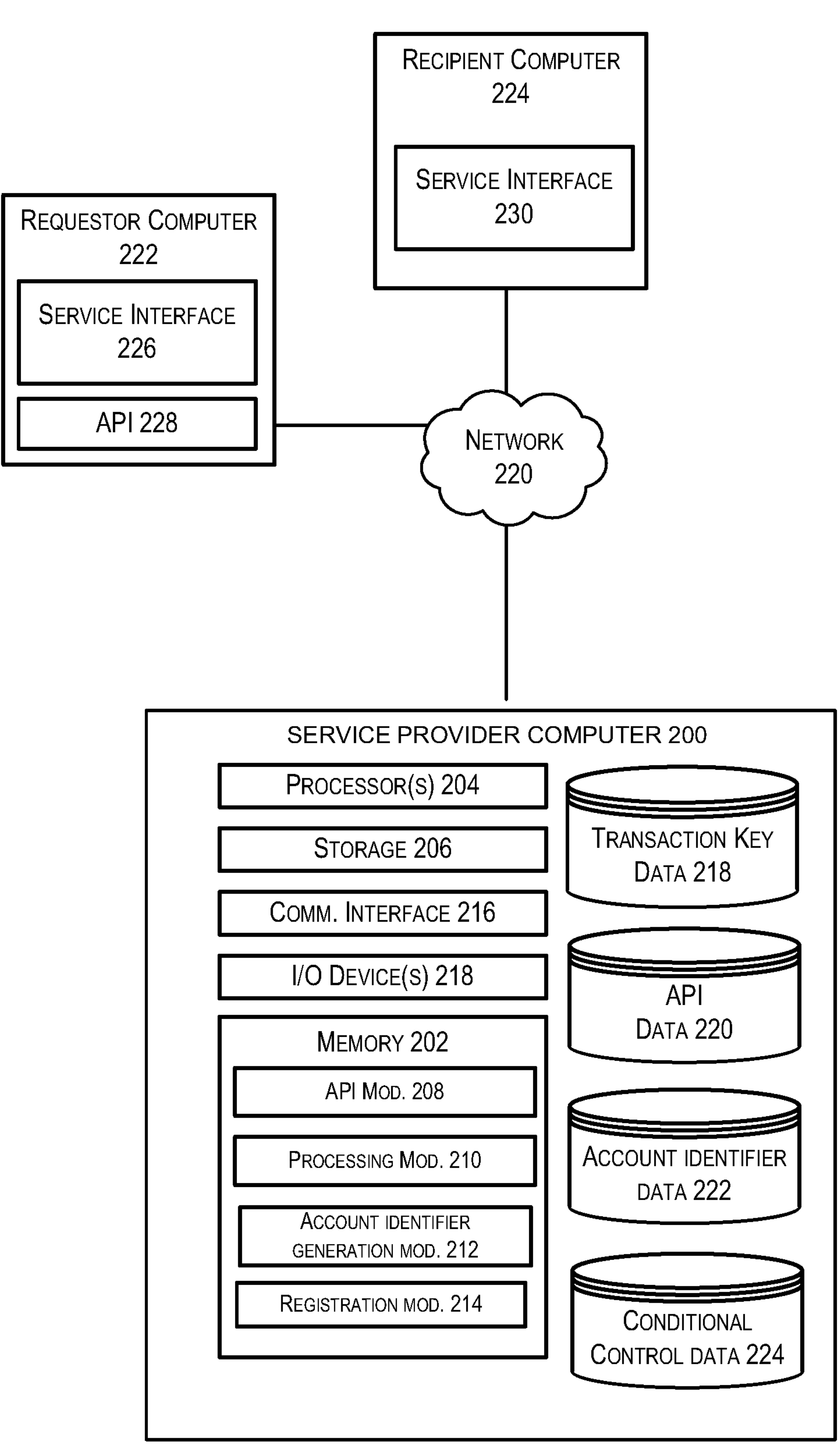
FIG. 2 shows a more specific block diagram of a system according to embodiments.

FIG. 2 shows a more detailed block diagram of an system for allowing accounts payable processing according to embodiments. In FIG. 2, service provider computer 200 may be in communication with at least one requestor computer 222. The service provider 200 and/or the requestor computer 222 may further be in communication with at least one recipient computer 224. Service provider computer 200, requestor computer 222, and recipient computer 224 may be respective examples of service provider computer 106, requestor computer 102, and recipient computer 104 depicted in FIG. 1.

The service provider computer 200 may include a server computer, and may be or be part of an accounts payable automation system. The service provider computer 200 can be implemented in a hosted computing environment. A hosted computing environment may also be referred to as a cloud-computing environment.

In one illustrative configuration, the service provider computer 200 may include at least one memory 202 and one or more processing units (or processors) 204.

Turning to the contents of the memory 202 in more detail, the memory 202 may include an operating system and one or more application programs or services for implementing the features disclosed herein including at least an API module 208 that, when executed by another computing device, is configured to generate, implement, and/or operate implement an application programming interface associated with that computing device. The API module 208 may comprise code, executable by a processor on a computing device to cause that computing device to generate (or operate) an API and transaction key. The transaction key may be an API key that is specifically associated with a requestor (e.g., a buyer) and a recipient (e.g., a supplier). In some embodiments, the API module 208 may request access credentials (e.g., login and password) from a user of a computing device, which uses the API module 208. In some embodiments, the API module 208 may generate an application programming interface for a computing device such that another computing device (e.g., the service provider computer 200) may make a call to the API in order to perform an action on behalf of the computing device.

In some embodiments, the memory 202 may also include a processing module 210 that, when used in conjunction with the processor(s) 204, is configured to conduct a requested transaction by calling upon an API. In some embodiments, the processing module 210 may comprise code, executable by the processor(s) 204 to, upon receiving a request to process a transaction on behalf of an entity, interact with an API associated with that entity in order to complete the payment on behalf of that entity to another entity. In some embodiments, an entity such as a requestor computer 222 may provide the service provider computer 200 with a request to complete a payment to a particular entity (e.g., a resource supplier). Upon receiving that request, the processing module 210 may identify an API and/or transaction key (e.g., from transaction key data 212 or API data 214) associated with the requesting entity. Upon retrieving the API and/or transaction key associated with the requesting entity, the processing module 210 may authenticate a relationship between the requestor and the entity to be paid. This may involve determining that the payee is enrolled as a resource supplier to the requesting entity as well as verifying that the requestor is an authorized party. In some cases, the requestor may be asked to provide access credentials associated with the requestor. These may be used by the API to authenticate that the requestor is an authorized representative of the requestor. Once the relationship between the requestor and the payee has been authenticated, the processing module 210 may proceed to process the requested transaction.

The processing module 210, with the processor 204, may retrieve an account identifier from the account identifier data storage 222 or from the account number generation module 212. The account identifier data storage 222 may contain account identifiers generated from the account number generation module 212 or from an authorizing entity computer in communication with the service provider computer 200. If the account identifier generation module 210 generates the account identifier, then the account identifier may be provided (e.g., in real time or in a batch process) to an appropriate authorizing entity computer associated with the requestor.

The account identifier may be an account number such as a credit or debit card account number. In some instances, the account identifier may be a "single use" account identifier, meaning that the account identifier is only used for the current transaction being processed, and once it is used, it is deleted from the service provider computer 200. In other embodiments, the account identifier may be used for many transactions. In embodiments, the account identifier is never transmitted or provided to the recipient computer of the recipient that is to be paid.

Once the account identifier is obtained, the processor 204 and the processing module 210 may initiate the generation of an authorization request message. In some embodiments, the service provider computer 200 generates an authorization request message on behalf of the payee that includes payment details (e.g., a payment account and amount) provided by the requestor. This authorization request message is then routed to an appropriate authorization entity computer via processing network (e.g., a payment processing network).

The service provider computer 200 may also comprise a registration module 214 that can include code for performing the requestor computer and recipient computer registration processes described herein.

The service provider computer 200 may also include a number of data stores, including transaction key data 218, which may maintain transaction keys associated with various requestor/recipient combinations, API data 220, which maintains a library of APIs associated with various entities (e.g., requestor computers 222), account identifier data 222 which may contain account identifiers that can be used with transactions, and conditional control data 224 which can contain data that can be used to control the authorization of transactions.

The service provider computer 200 may also contain communications interface(s) 216 that enable the service provider computer 200 to communicate with a stored database, another computing device or server, one or more remote devices, and/or any other suitable electronic devices. In some embodiments, the communication interface 216 may enable the service provider computer 200 to communicate with other electronic devices on a network 220 (e.g., on a private network). The service provider computer 200 may also include input/output (I/O) device(s) and/or ports 218, such as for enabling connection with a keyboard, a mouse, a pen, a voice input device, a touch input device, a display, speakers, a printer, etc. In some embodiments, the service provider computer 200 may be in communication with a requestor computer 222 and/or a recipient computer 224 via the network 220.

In some embodiments, the network 220 may include any one or a combination of many different types of networks, such as cable networks, the Internet, wireless networks, cellular networks, and other private and/or public networks. While the illustrated example depicts various electronic devices accessing the service provider computer 200 over the network 220, the described techniques may equally apply in instances where the electronic devices interact with the service provider computer 200 over a landline phone or computer, via a kiosk, or in any other manner.

The requestor computer 222 may be any suitable type of computing device capable of submitting a request to complete a transaction. The requestor computer 222 may include a memory and one or more processors capable of processing computer executable instructions. The requestor computer 222 may also include a service interface 226 which enables interaction between the requestor computer 222 and the service provider 200. In some embodiments, the requestor computer 222 may have an API 228 and/or transaction key, which may be stored in memory. The requestor computer 222 may provide the data via the API 228 and/or may provide transaction key to the service provider computer 200 (if the transaction key is not generated by the resource provider computer 200).

The recipient computer 224 may be operated by a resource supplier that is to be paid. The recipient computer 224 may include a service interface 230, which allows it to communicate with the resource provider computer 200.

Figure 3:
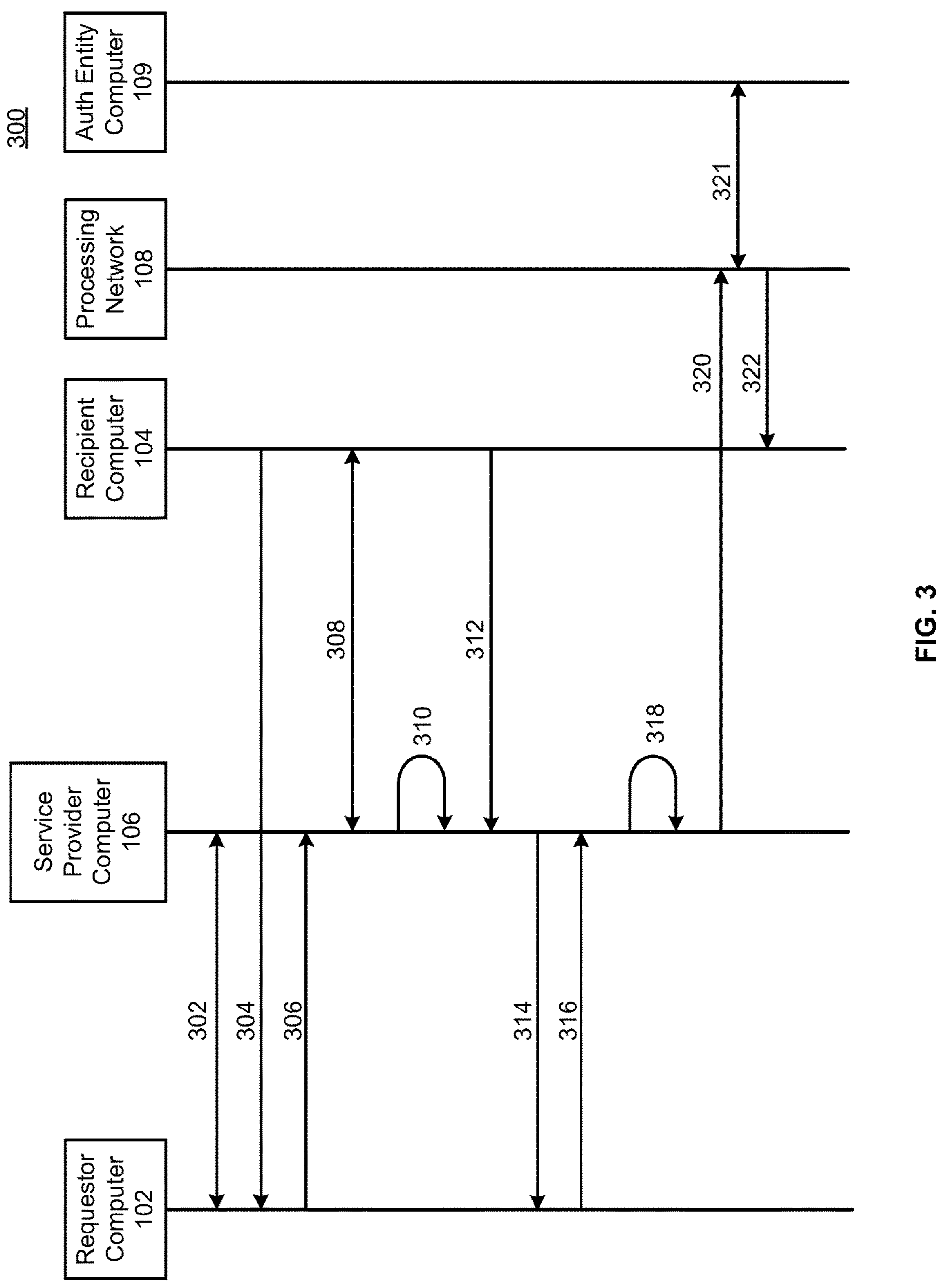
FIG. 3 shows a swim lane diagram illustrating an accounts payable process in accordance with at least some embodiments.

FIG. 3 shows a swim lane diagram illustrating a process for providing direct payment between a requestor computer and a recipient computer in accordance with at least some embodiments. Process 300 illustrates a series of exemplary interactions between a requestor computer 102, a service provider computer 106, a recipient computer 104, and a processing network 108, each of which are described in relation to FIG. 1 above.

Process 300 may begin at 302, when a requestor computer 102 is registered or enrolled with the service provider computer 106. In some embodiments, the requestor computer 102 may access an API module, which causes the requestor computer 102 to initiate the generation of an API specific to the requestor computer 102. The API may then be stored by the service provider computer 106. During generation of an API, a user of the requestor computer 102 may be asked to provide access credentials (e.g., a login and password) to be used to authenticate a user of the API.

At 304, a recipient computer 104 (or the service provider computer 106 on behalf of the recipient computer 104) may contact the requestor computer 102 to provide an invoice for the payment for goods or services received by the requestor operating the requestor computer 102. In some embodiments, this invoice may be transmitted directly between the recipient computer 104 and the requestor computer 102. In some embodiments, the recipient computer 104 may submit the invoice to the service provider computer 106, which may then communicate that request to the requestor computer 102. In the case in which the invoice is communicated between the recipient computer 104 and the requestor computer 102, the requestor computer 102 may require that the recipient computer 104 also enroll with the service provider computer 106. In some embodiments, this may involve the requestor computer 102 providing an indication of, or contact information for, the recipient computer 104 to the service provider computer 106 in a request for enrollment at 306. For example, the requestor computer 102 may provide the service provider computer 106 with a recipient identifier such as an email address for a representative of the recipient. In these embodiments, the service provider computer 106 may contact and prompt the recipient (e.g., via the contact information) at 308 in order to initiate an enrollment process for the recipient computer 104 and/or the recipient operating the recipient computer 104, and the recipient computer 104 may respond to the prompt with an appropriate affirmation of the start the enrollment process. In other embodiments, the requestor computer 102 may provide the recipient computer 104 with a link or distributable software application that, when accessed, causes the recipient computer 104 to communicate with the service provider computer 106 in order to complete an enrollment process.

At 310, the process may involve enrollment of the recipient computer 104 and/or the recipient operating the recipient computer 104 with the service provider computer 106. This may involve creating and recording a relationship between the recipient computer 104 and the requestor computer 102. It should be noted that the recipient computer 104 may be one of several recipient computers 104 having a relationship with a particular requestor computer 102. Likewise, each recipient computer 104 may have relationships with multiple requestor computers. A transaction key may be created for a particular requestor computer 102/recipient computer 104 relationship or association. The transaction key may be an identifier (a string of characters) that represents that relationship.

At 312, the recipient computer 104 may submit an invoice to the service provider computer 106 that lists an amount due from requestor computer 102, in response to providing goods or services by the recipient operating the recipient computer 104 to the requestor operating the requestor computer 102. In some embodiments, the invoice may include details regarding a list of resources (e.g., goods and/or services) provided to the requestor computer 102, a recipient identifier, a requestor identifier, a requestor identifier, and a transaction amount.

At 314, the process may involve notifying the requestor computer 102 that an invoice has been received. In some embodiments, the requestor computer 102 may be provided with a list of all outstanding invoices provided with respect to the requestor computer 102 by recipient computers 104. In some embodiments, the requestor computer 102 may be provided the ability to review each invoice in detail in order to approve each invoice.

At 316, the process may involve the requestor computer 102 providing a request to the service provider computer 106 to initiate payment for an invoice. The request may include a requestor identifier associated with a requestor (e.g., a requestor or requestor computer identifier previously assigned to the requestor by the service provider computer 106 or previously provided to the service provider computer 106 by the requestor computer 102) and a recipient identifier (e.g., a recipient or recipient computer identifier previously assigned to the recipient by the service provider computer 106 or previously provided to the service provider computer 106 by the recipient computer 102) associated with a recipient, and an acknowledgement of the amount to be paid. In some embodiments, the request may be received automatically in response to an invoice being approved for payment by the requestor computer 102.

At 318, the process may involve the service provider computer 106 initiating the payment of the invoice on behalf of the recipient. This can be done without any communication with the recipient computer 104. To do so, the service provider computer 106 may identify an API and/or transaction key (e.g., from transaction key data or API data) associated with the requestor computer 102 and/or the recipient computer 104. Upon retrieving the API and/or transaction key associated with the requestor computer 102, the service provider computer 106 may authenticate a relationship between the requestor and the recipient. This may involve determining that the recipient computer 104 is enrolled as a resource supplier to the requestor computer 102 as well as verifying that the requestor is an authorized party.

Upon authentication of the relationship, the service provider computer 106 may use the previously described transaction processing module to obtain an account identifier associated with the requestor computer 102 and/or the current transaction being conducted. Once the service provider computer 106 has obtained the account identifier, it may then initiate the generation of an authorization request message, which will be sent to an authorizing entity computer for approval. The initiation of the generation of the authorization request message may include the service provider computer 106 actually generating the authorization request message using the account identifier and the transaction amount. In other embodiments, the initiation of the generation of the authorization request message may include providing a data packet including the account identifier and the transaction amount to a payment processor (e.g., a computer in the processing network 108) to generate the authorization request message.

At 320, if the authorization request message is generated by the service provider computer 106, then it may be transmitted to the processing network 108. The authorization request message may include at least the invoiced amount (or an amount derived from the invoiced amount such as a total including the invoiced amount or an amount that includes the invoiced amount, reduced by any fees) and a payment account identifier associated with the requestor computer 102.

Conditional control data may also be applied to the transaction at this time. For example, the requestor 102 may need to pay an invoice for $1001.37, and may provide conditional control data to the service provider computer 106 indicating that the authorization request message should only be generated or approved if the authorization request message is for the exact amount of $1001.37 or is for anything less than $1002.00. The use of conditional control data provides assurance to the requestor operating the requestor computer 102 that any authorization request messages that are submitted for approval will contain the correct invoice amount or will not substantially deviate from the invoice amount.

At 321, once received by the processing network 108, the processing network 108 may look up the appropriate authorizing entity computer using a routing table and a portion of the account identifier, and may route it to the authorizing entity computer 109. The authorizing entity computer 109 may then decide if the transaction is authorized, and may respond to the processing network 108 with an authorization response message comprising an indicator indicating if the transaction is approved or declined. In other embodiments, the processing network 108 may provide the authorization response message directly to the recipient computer 104 without communicating with the authorizing entity computer 109.

At 322, the process may involve the recipient computer 104 receiving an authorization response message from the processing network 108.

At the end of the day or some other time, a clearing and settlement process can occur. The clearing and settlement process can transfer money from the authorizing entity operating the authorizing entity computer 109 to the account of the recipient (which may be held by the service provider computer or a financial institution affiliated with the recipient).

Figure 4:
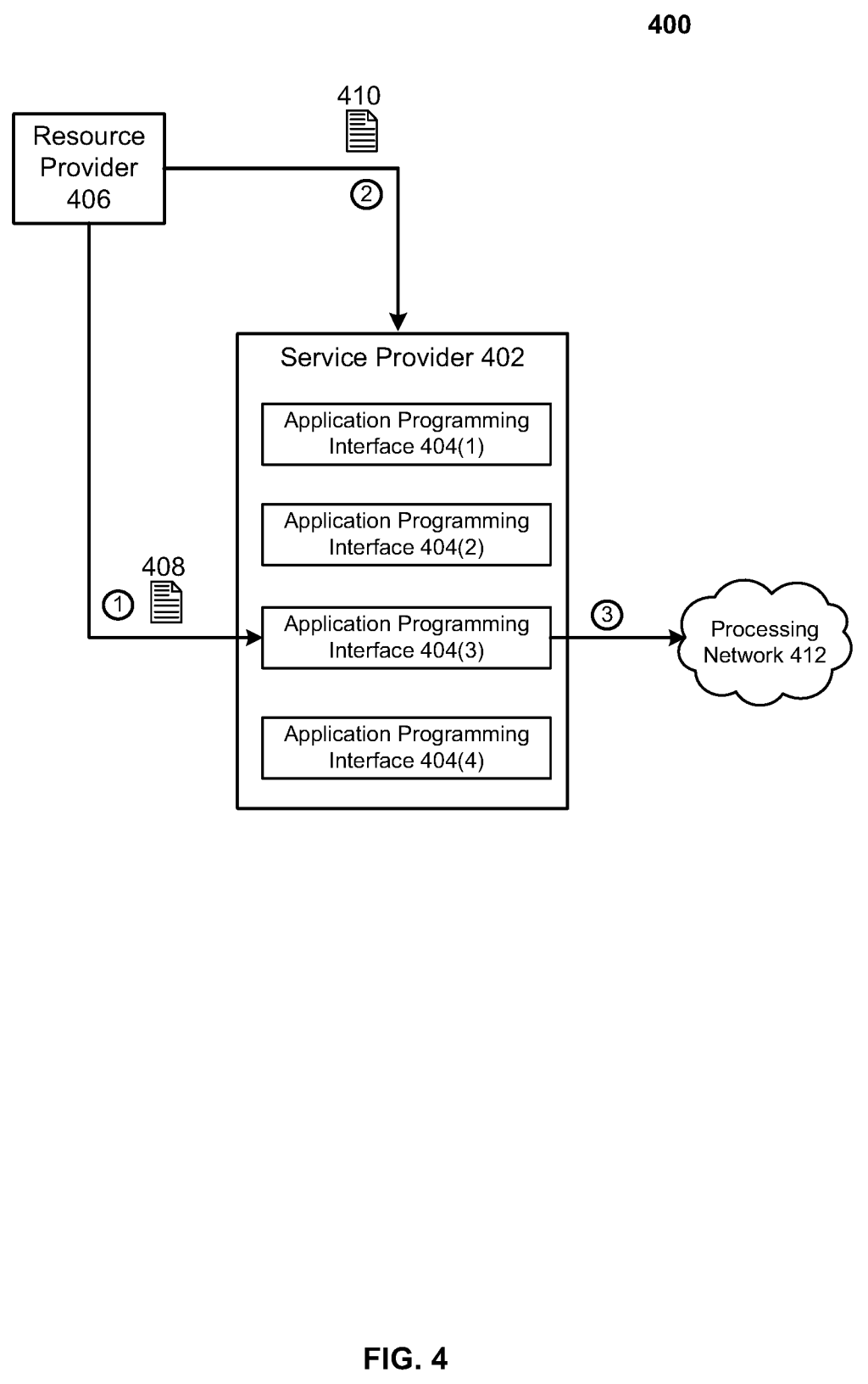

FIG. 4 depicts a first exemplary process by which a service provider may enable a resource provider to push a "straight-through-payment" to a recipient entity. In FIG. 4, a service provider 402 may maintain a number of APIs 404 (e.g., 404(1), 404(2), 404(3) and 404(4)) each associated with a different resource provider. A resource provider 406 may interact with the service provider 402 in the manner described below.

In a step 1 of the exemplary process 400, an application programming interface 404 (in the depicted example, 404(3)) is generated for the resource provider 406. To do this, the resource provider 406 may participate in an enrollment process for the service provider 402 during which the resource provider 406 may provide enrollment data 408. The enrollment data may include a number of data associated with the resource provider 406. In some embodiments, the enrollment data 408 may include access credentials such as a login and/or password for the resource provider 406. In some embodiments, the API 404 associated with the resource provider 406 may be generated by the service provider 402 using the enrollment data 408. In some embodiments, the API 404 associated with the resource provider 406 may be generated by the resource provider 406 using a module or library made accessible by the service provider 402. In these embodiments, the resource provider 406 may then provide the generated API back to the service provider 402.

Additionally, the resource provider 406 may cause one or more resource suppliers (e.g., potential recipient entities) to enroll with the service provider 402. To do this, the resource provider 406 may provide the one or more resource suppliers with access to an API generation module and/or enrollment module maintained by the service provider 402. The resource suppliers may then provide enrollment data to the service provider 402.

In a step 2 of the exemplary process 400, the resource provider 406 may initiate a payment transaction to a recipient computer. To do this, the resource provider 406 may provide transaction data 410 to the service provider 402. In some embodiments, the transaction data 410 may be formatted as an API call, which includes an identifier for a resource supplier (e.g., recipient computer) and, in some cases, a payment account identifier. The resource provider 406 may provide access credentials to be used in authenticating a user or agent of the resource provider 406. In some embodiments, the resource provider 406 may also transmit an identifier for the API 404(3), which the service provider 402 may use to identify the API 404(3). In some embodiments, the service provider may identify the API 404(3) by virtue of its association with the resource provider 406. In some embodiments, the service provider 402 may further authenticate a relationship between the resource provider 406 and the resource supplier.

In a step 3 of the exemplary process 400, the API 404(3) associated with the resource provider 406 may conduct the payment transaction in accordance with the provided transaction data. To do this, the API 404(3) may authenticate access credentials provided by a user or agent of the resource provider 406. Upon authentication of access credentials, the API 404(3) may generate an authorization request message that corresponds to the transaction data 410 provided. The authorization request message may be generated on behalf of the resource supplier for the transaction, using details provided by the resource supplier during the enrollment process. The authorization request message may then be routed to an authorization provider for the payment account via a processing network 412. Because the authorization request message is generated on behalf of the resource supplier, a charged amount for the transaction may be transferred directly to an account associated with the resource supplier upon settlement.

FIG. 5 depicts a second exemplary process by which a service provider may enable a resource provider to push a "straight-through-payment" to a recipient entity. In FIG. 5, a service provider 502 may maintain a number of APIs 504 (e.g., 504(1), 504(2), 504(3) and 504(4) each associated with a different resource supplier. A resource provider 506 may interact with the service provider 502 in the manner described below to complete a transaction with a resource supplier 508.

In a step 1 of the exemplary process 500, an application programming interface 504 (in the depicted example, 504(3)) is generated for the resource supplier 508. To do this, the resource provider 506 may first participate in an enrollment process for the service provider 502. The resource provider 506 may then provide a link or referral to the resource supplier 508 requesting that the resource supplier 508 also enroll with the service provider 502. The resource supplier 508 may then enroll with the service provider 502 by providing enrollment data 510. The enrollment data 510 may include a number of data associated with the resource supplier 508. In some embodiments, the enrollment data 510 may include access credentials such as a login and/or password for the resource supplier 508 and an API 504 may be generated in association with the resource supplier 508. In some embodiments, the API 504 associated with the resource supplier 508 may be generated by the service provider 502 using the enrollment data 510. In some embodiments, the API 504 associated with the resource supplier 508 may be generated by the resource supplier 508 using a module or library made accessible by the service provider 502. In these embodiments, the resource supplier 508 may then provide the generated API back to the service provider 502.

In a step 2 of the exemplary process 500, the resource provider 506 may initiate a payment transaction to a recipient computer. In some embodiments, the payment transaction may be initiated upon receipt of an invoice by the resource provider 506 from the resource supplier 508. To do this, the resource provider 506 may provide transaction data 512 to the service provider 502. In some embodiments, the transaction data 510 may be formatted as an API call, which includes an identifier for the resource supplier 508 and, in some cases, a payment account identifier. The resource provider 506 may provide access credentials to be used in authenticating a user or agent of the resource provider 506. The service provider may identify the API 504(3) by virtue of its association with the resource supplier 508. In some embodiments, the service provider 502 may further authenticate a relationship between the resource provider 506 and the resource supplier 508.

In a step 3 of the exemplary process 500, the API 504(3) associated with the resource provider 506 may conduct the payment transaction in accordance with the provided transaction data. To do this, the API 504(3) may authenticate access credentials provided by a user or agent of the resource provider 506. Upon authentication of access credentials, the API 504(3) may generate an authorization request message that corresponds to the transaction data 512 provided. The authorization request message may be generated on behalf of the resource supplier for the transaction, using details provided by the resource supplier during the enrollment process. The authorization request message may then be routed to an authorization provider for the payment account via a processing network 514. Because the authorization request message is generated on behalf of the resource supplier, a charged amount for the transaction may be transferred directly to an account associated with the resource supplier 508 upon settlement.

Embodiments of the disclosure provide for a number of advantages over conventional systems. For example, embodiments of the system described herein enable a "straight-through payment" to be made in a business-to-business payment environment. It should be noted that B2B payment environments suffer from a number of challenges which are not prevalent in typical peer to peer payment systems because of the large number, and frequency, of transactions. Because of this, conventional B2B payment systems often involve providing an account number to the intended recipient of the payment, who then uses it to be paid. This presents a data security problem, since a recipient may not be honest and may use the account number in a fraudulent manner. This also means that the transfer will be initiated at the discretion of the payee, which does not allow for predictability for the payer. These conventional techniques result in a system which is burdensome for both entities in the B2B relationship. Further, the onboarding of recipients and requests is difficult in conventional systems.

Embodiments of the disclosure, on the other hand, remove these burdens on the entities within the B2B relationship by providing "straight-through payments" in that the payer, upon initiating the payment, causes a service provider computer receive an instruction to pay an invoice from a requestor, and then to initiate payment using an obtained account number without contacting the recipient. The recipient never receives the account number and therefore cannot conduct fraudulent transactions. Further, because the service provider operating the service provider computer is a trusted entity, there is no need to create a temporary, single use account (although though it may do so) and the payer can decide when the transaction occurs.

It should be understood that any of the embodiments of the present disclosure can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present disclosure using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present disclosure may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more features from any embodiment may be combined with one or more features of any other embodiment without departing from the scope of the disclosure.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:

enrolling, by a server computer, a requestor computer with the server computer to enable the server computer to initiate generation of an authorization request message for a transaction;

generating, by an API module of the server computer, an API and transaction key specific to the requestor computer enrolled with the server computer;

storing, by the server computer, the API and transaction key specific to the requestor computer;

receiving, by the server computer, an invoice from a recipient computer that is a supplier computer associated with a first business, the invoice providing details regarding goods and/or services purchased by a requestor operating the requestor computer that is a merchant computer associated with a second business, and an amount associated with the goods and/or services;

receiving, by the server computer from the merchant computer, an instruction to pay the supplier computer for the amount, wherein the instructions comprise a merchant identifier that was assigned to the merchant computer and a supplier identifier that was assigned to the supplier computer;

retrieving, by the server computer, the API and a transaction key associated with the merchant computer;

authenticating, by the server computer, a relationship between the merchant computer and the supplier computer based on the API and the transaction key associated with the merchant computer, wherein the authenticating comprises determining that the supplier computer is enrolled as a resource supplier to the merchant computer;

after the relationship is authenticated, obtaining, by the server computer, an account identifier associated with the merchant computer, without communicating the account identifier associated with the merchant computer with the supplier computer; and initiating, by a processing module in the server computer, the generation of the authorization request message on behalf of the recipient computer to conduct a payment transaction, the authorization request message comprising the account identifier and the amount or an amount derived from the amount to an authorizing entity computer.

2. The method of claim 1, wherein the account identifier is a single use account identifier.

3. The method of claim 1, wherein the server computer stores conditional control data.

4. The method of claim 1, further comprising:

prompting, by the server computer, the recipient computer operated by a supplier to accept payment through the server computer; and receiving, by the server computer, a response to the prompt.

5. The method of claim 1, wherein the server computer is a service provider computer.

6. The method of claim 1, wherein the server computer comprises an application programming interface associated with the recipient computer.

7. The method of claim 1, wherein the server computer comprises a registration module.

8. The method of claim 7, further comprising:

transmitting, by the server computer to the requestor computer, a message indicating that the invoice has been received by the server computer.

9. The method of claim 1, wherein the account identifier is an account number.

10. The method of claim 1, wherein the account identifier is a single use account identifier comprising sixteen characters.

11. A server computer comprising:

a processor; and a memory including instructions that, when executed with the processor, cause the server computer to perform a method comprising:

enrolling a requestor computer with the server computer to enable the server computer to initiate generation of an authorization request message for a transaction;

generating, by an API module of the server computer, an API and transaction key specific to the requestor computer enrolled with the server computer;

storing the API and transaction key specific to the requestor computer;

receiving an invoice from a recipient computer that is a supplier computer associated with a first business, the invoice providing details regarding goods and/or services purchased by a requestor operating the requestor computer that is a merchant computer associated with a second business, and an amount associated with the goods and/or services;

receiving an instruction to pay the supplier computer for the amount, wherein the instructions comprise a merchant identifier that was assigned to the merchant computer and a supplier identifier that was assigned to the supplier computer;

retrieving the API and a transaction key associated with the merchant computer;

authenticating, by the server computer, a relationship between the merchant computer and the supplier computer based on the API and the transaction key associated with the merchant computer, wherein the authenticating comprises determining that the supplier computer is enrolled as a resource supplier to the merchant computer;

after the relationship is authenticated, obtaining an account identifier associated with the merchant computer, without communicating the account identifier associated with the merchant computer with the supplier computer; and initiating the generation of the authorization request message on behalf of the recipient computer to conduct a payment transaction, the authorization request message comprising the account identifier and the amount or an amount derived from the amount to an authorizing entity computer.

12. The server computer of claim 11, wherein the server computer is programmed to perform automated accounts payable processing.

13. The server computer of claim 11, wherein the server computer stores conditional control data, which provides controls on processing of any authorization request messages.

14. The server computer of claim 11, wherein the server computer comprises a communication interface.

15. The server computer of claim 11, wherein the server computer comprises a database comprising API data.

16. The server computer of claim 11, wherein the recipient computer is operated by a supplier.

17. The server computer of claim 11, wherein the requestor computer is operated by a buyer, and wherein the account identifier comprises a portion that identifies the authorizing entity computer.

18. The server computer of claim 11, wherein the authorization request message comprises the amount, the account identifier, and a message type indicator.

19. The method according to claim 1, wherein the recipient computer is enrolled in an accounts payable automation system associated with the server computer.

20. The method according to claim 1, wherein the server computer generates an API that is specific to each of a plurality of different requester computers.

* * * * *